UNITED STATES PATENT OFFICE.

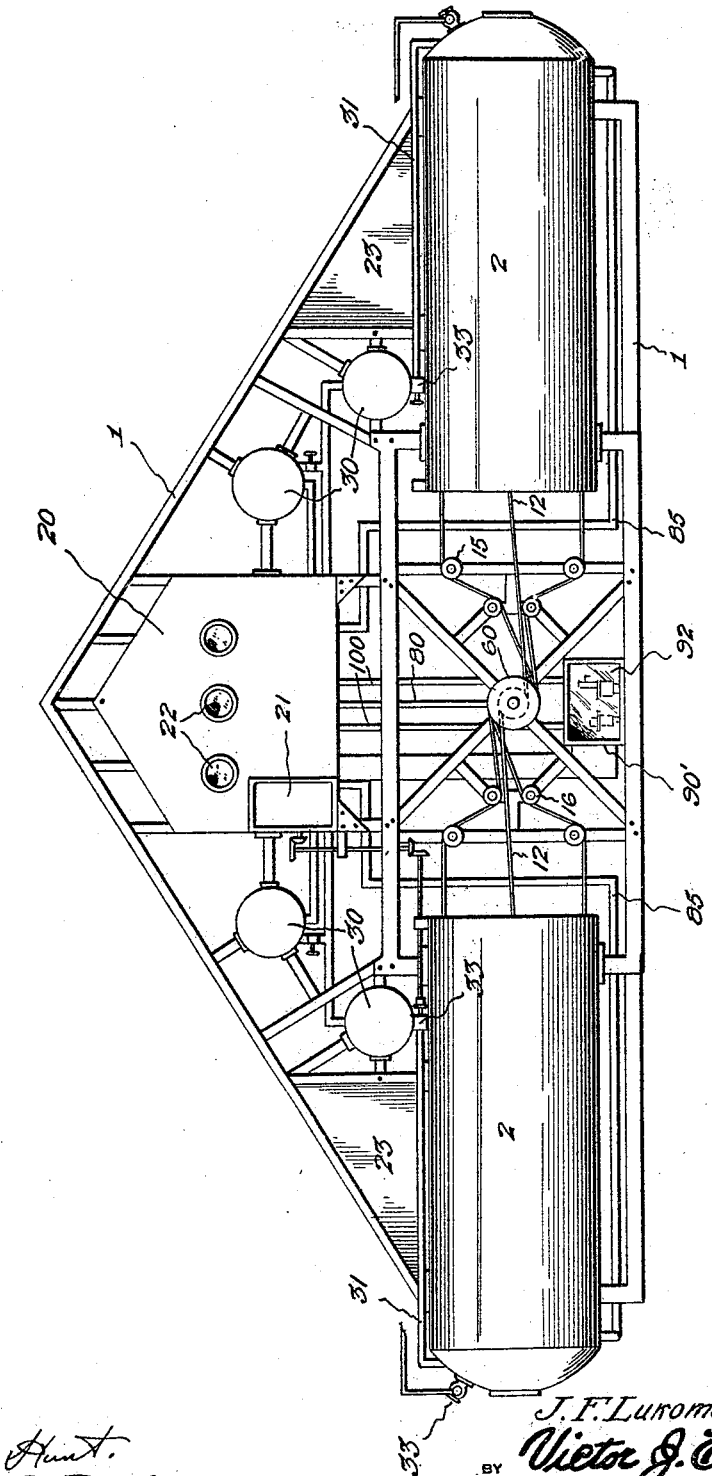

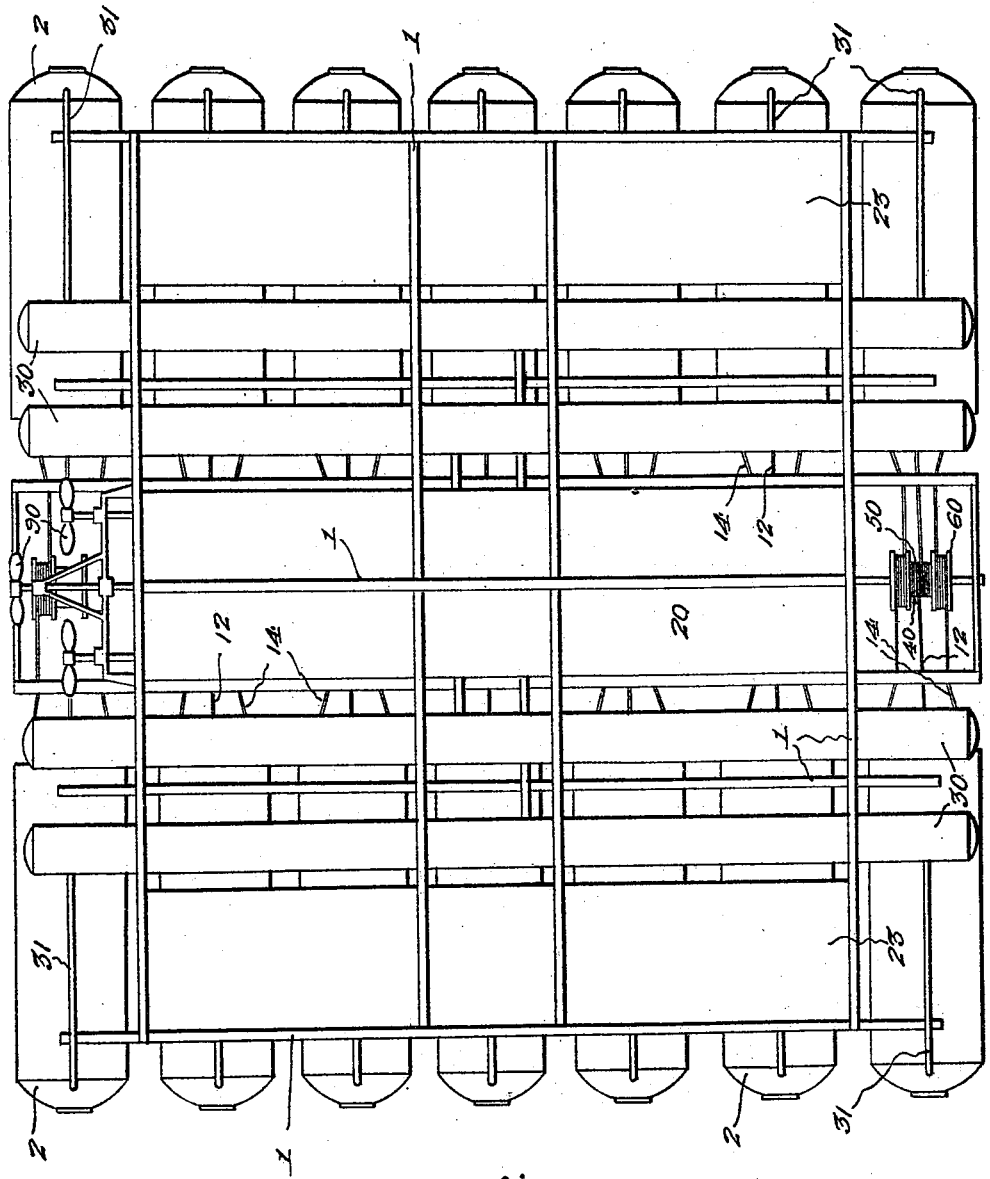

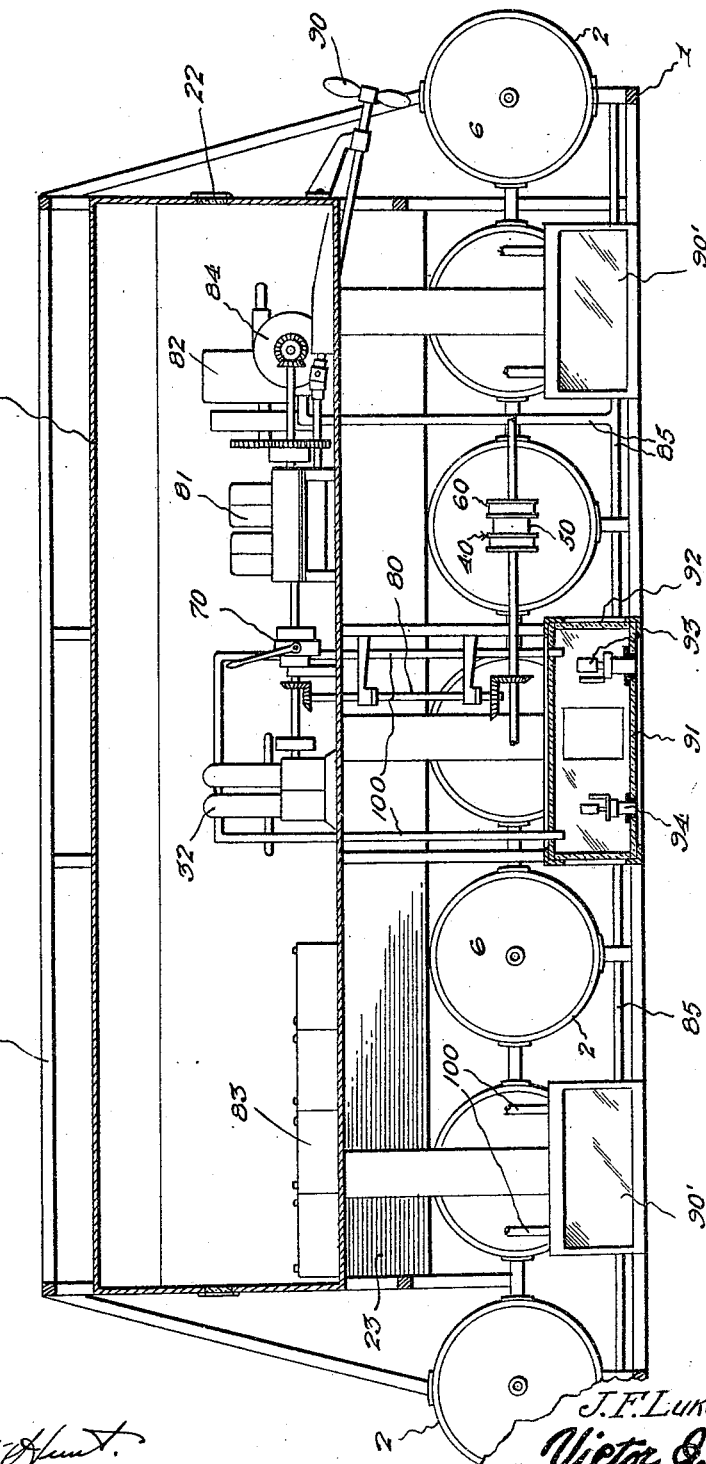

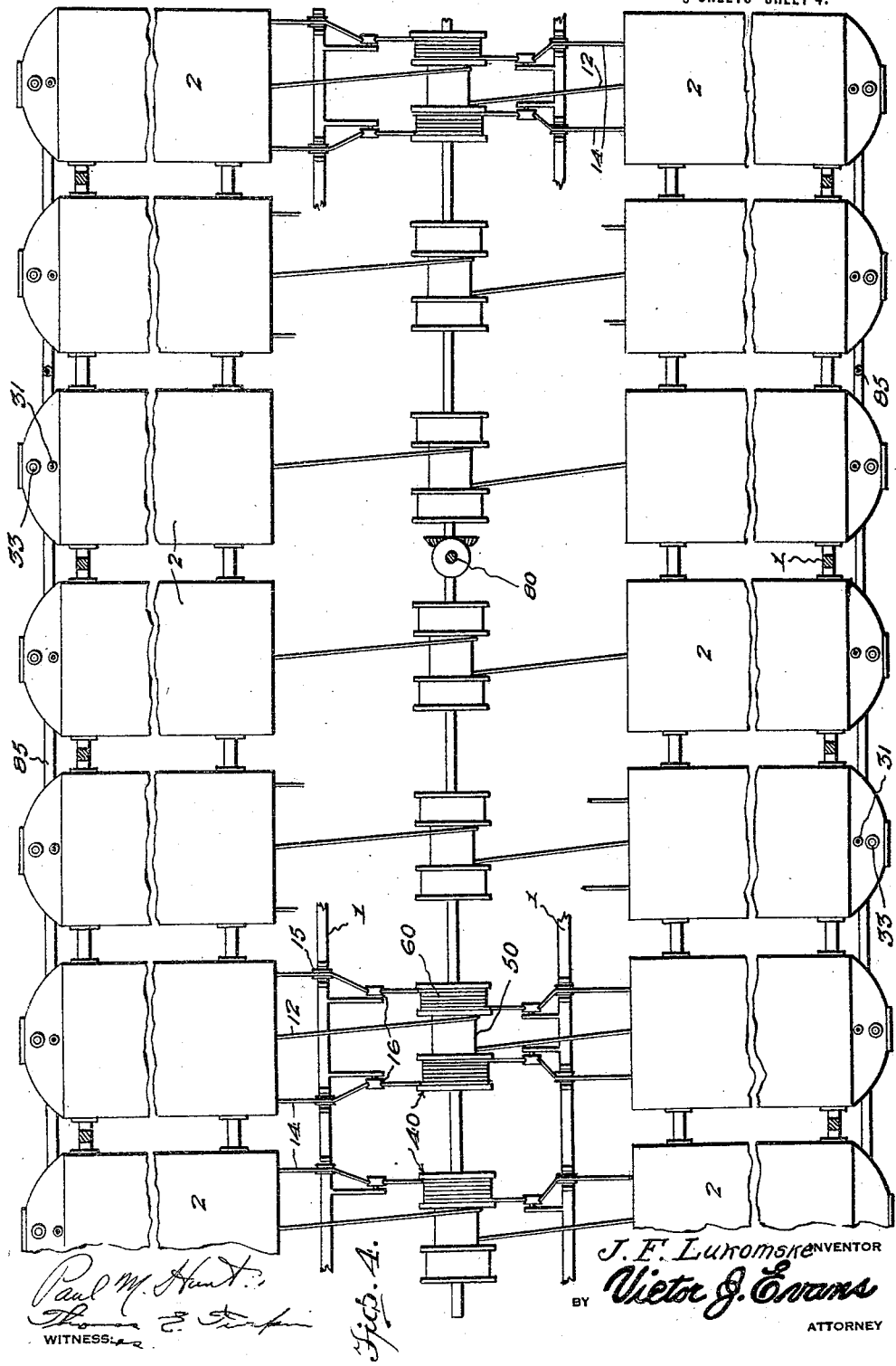

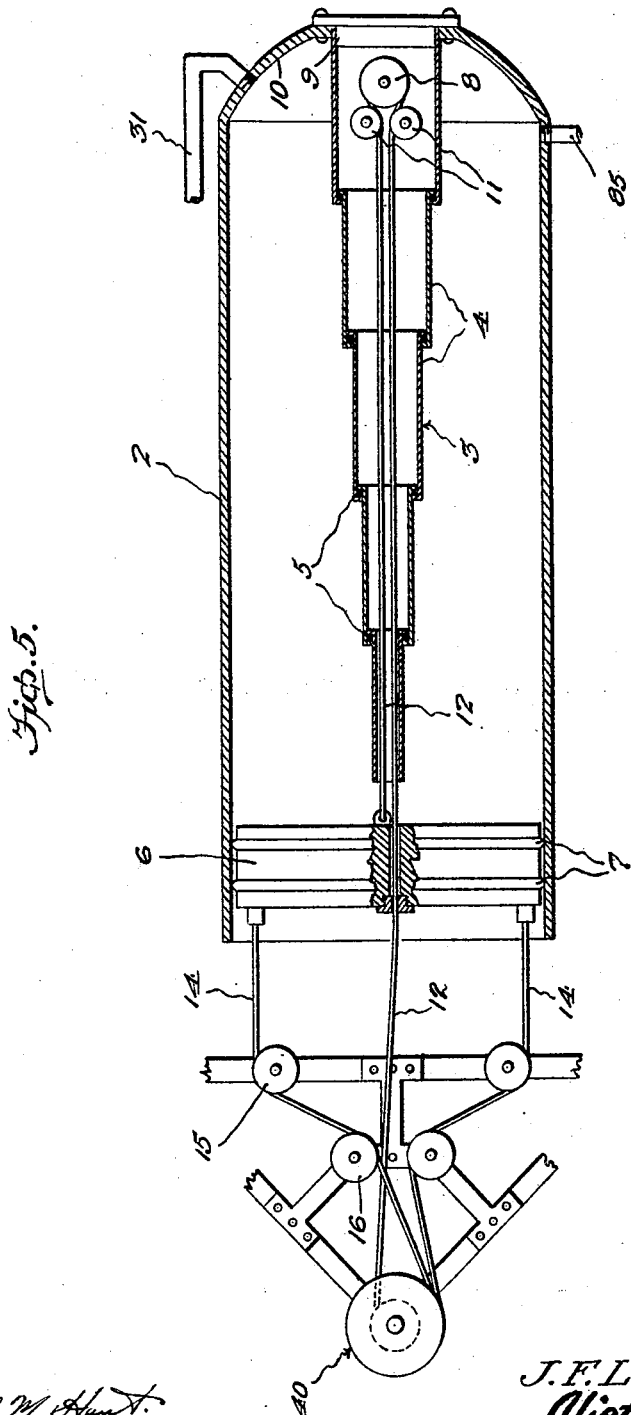

JOHN F. LUKOMSKE, OF BRIDGEPORT, CONNECTICUT.

SALVAGE VESSEL.

1,413,413. Specification of Letters Patent. Patented Apr. 18, 1922.

Application filed August 23, 1921. Serial No. 494,691.

*To all whom it may concern:*

Be it known that I, JOHN F. LUKOMSKE, a citizen of United States, residing at Bridgeport, in the county of Fairfield and State of Connecticut, have invented new and useful Improvements in Salvage Vessels, of which the following is a specification.

The object of my present invention is the provision of a salvage vessel capable of being propelled when submerged or when on the surface of a body of water and equipped with means whereby the vessel may be submerged and raised with facility, and also equipped with means whereby accurate observation can be made by one or more persons under the surface of a body of water.

To the attainment of the foregoing, the invention consists in the improvement as hereinafter described and definitely claimed.

In the accompanying drawings, forming part hereof:—

Figure 1 is an end view of the salvage vessel constituting the best practical embodiment of my invention of which I am aware.

Figure 2 is a plan view of the same.

Figure 3 is a vertical section of the vessel.

Figure 4 is a horizontal section taken in the plane indicated by the line 4—4 of Figure 3, looking downwardly.

Figure 5 is an enlarged longitudinal section showing one of the air and water receiving cylinders of the vessel and the appurtenances thereof.

Similar numerals of reference designate corresponding parts in all of the views of the drawings.

The main frame 1 of my novel vessel may be of the general construction illustrated or of any other construction compatible with the purpose of the invention, and appropriately secured in the lower portion of the said main frame are two sets of air and water receiving cylinders 2 which have to do with the ready submerging and raising of the vessel as will hereinafter be pointed out in detail. Each of the said sets of cylinders 2 comprises by preference seven cylinders, though the number of cylinders 2 may of course be discretionary with the manufacturer without affecting my invention. The outer ends of the cylinders 2 are closed while the inner ends thereof are open, and it will also be noted that the inner end of each cylinder 2 of each set is arranged opposite and in alinement with the inner end of a cylinder tube of the other set. Occupying the longitudinal center of each cylinder 2 is a telescopic tubular casing 3. As best shown in Figure 5 the said casing 3 is made up of a plurality of sections 4, and at the mouths of the said sections 4 with the exception of the innermost section 4 are gaskets 5 of rubber or equivalent material calculated to prevent water from gaining access to the interior of the casing 3. In each cylinder 2 is a piston 6. This piston 6 is appropriately connected to the inner end of the innermost section 4 of the casing 3. It will also be observed that the piston 6 is provided with packing rings 7 of rubber or appropriate material designed and adapted to prevent water or air escaping between the periphery of the piston and the wall of the cylinder 2. Housed in the outermost section 4 of each telescopic casing 3 is a sheave 8. I would also have it understood here that the said outermost section 4 is fixedly connected at 9 to the head 10 which closes the outer end of the cylinder 2. Also housed in the outermost section 4 are one or more guide sheaves 11. Connected at one end to each piston 6 is a cable 12 that is carried through the adjacent telescopic casing 3 and is engaged with the sheave 8 and the sheaves 11 as shown. The return stretch of the said cable 12 is carried through an appropriately packed transverse bore in the piston 6 and is also carried through the open inner end of the cylinder 2. Connected to the inner side of each piston 6 are cables 14 which are carried around sheaves 15 and 16 supported in the main frame. Manifestly when the several cables 12 are taken up, the several pistons 6 will be moved outwardly in the cylinders 2 to displace air from the cylinder and to bring about the occupation of the cylinders by water, this in order to expeditiously and effectively submerge the vessel. On the other hand when the several cables 12 are released and the cables 14 are taken up, the pistons 6 will be moved inwardly to displace water from the cylinders 2 and to bring about the occupation of the cylinders by air, this in order to raise the vessel when the same is submerged and to contribute to the floatability of the vessel when the same is on the surface of a body of water.

Arranged centrally within the upper portion of the main frame 1 is a house 20 the walls and door 21 of which are water-proof, the door being appropriately packed to exclude water when the vessel is submerged. The said house 20 is for the occupancy of the operator of the vessel, and is provided with port holes 22 for observation purposes when the vessel is submerged and also when it is at rest or is moving on the surface.

Arranged in the main frame 1 at opposite sides of the house 20 are air tight tanks 23. The said tanks 23 serve merely to contribute to the floatability of the vessel.

Grouped at opposite sides of the house 20 are storage tanks 30 from which conduits 31 lead to the outer end portions of the cylinders 2. The pump for supplying the tanks 30 with air under high pressure is designated by 32 and is located in the house 20 as illustrated. It will also be observed that manually controlled valve means 33 is provided whereby communication may be established between the tanks 30 and the cylinders 2, and between the outer end portions of the said cylinders 2 and the atmosphere. Manifestly when air under pressure is let into the cylinders 2, the said fluid pressure will assist in the movements of the pistons 6 inwardly; also, when air under pressure is exhausted from the cylinders 2 at the outer sides of the pistons 6, the outward movement of the pistons will be rendered easy.

It will be apparent from the foregoing that when the pistons 6 are moved outwardly in the cylinders 2 water will enter the said cylinders behind the pistons 6 with the result that the vessel will be submerged in proportion to the amount of water let into the cylinders 2 by the said movement of the pistons 6. As before stated the outward movement of the pistons 6 is effected through the medium of the cables 12. The inner movement of the pistons 6 which is carried out as a condition precedent to raise the vessel from the deep is accomplished through the medium of the cables 14. At this point I would also have it understood that I employ a reel 40 with drums 50 and 60 complementary to the said cables, and that I also employ reversing means 70 so that the pistons 6 may be moved in either direction without interrupting the connection 80 between the reel and the motor 81 in the house 20. Also arranged in the house 20 is a generator 82 and storage batteries 83. The motor 81 is appropriately connected with three propellers 90 more or less in order to propel the vessel when on the surface of the water, and when the vessel is submerged it is electrically propelled through the medium of the means illustrated with current supplied from the storage batteries mentioned. The motor 81 may be and preferably is of internal combustion type.

At 84 in the house 20 I provide a pump that that is connected by pipes 85 with the outer portions of the cylinders 2 so that any water that may find its way into the said outer portions of the cylinders 2 may be readily removed.

Carried in the main frame 1 at the lower side and ends thereof are bells 90', each to be occupied by one or more operatives. These bells 90' are provided with glass bottoms 91 and plate glass side walls 92, and each preferably contains a high power electric pump 93, and appropriate apparatus such as drills 94; the said drills being arranged to work through appropriately packed openings in the bottom and sides of the bell. It will also be noted that each or the bells is connected by pipes 100 with apparatus for supplying the interior of the bells with fresh air and for exhausting vitiated air from the bell.

It will be apparent from the foregoing that my novel salvage vessel is capable of being positively submerged and is positively adapted to be quickly raised; also, that the vessel is capable of being propelled and handled with facility when submerged and also when it is at the surface of a body of water, and all of the mechanisms are under the control of operatives in the house 20 who also have control of the apparatus for sustaining life in the bells 90'.

Having described my invention, what I claim and desire to secure by Letters-Patent, is:—

1. A salvage vessel comprising a main frame, cylinders carried by said main frame and having inner open ends arranged opposite and spaced from each other, means located between the cylinder ends to take up and let off cables, pistons movable in the said cylinders, cables between the pistons and the said intermediate means to move the pistons outwardly in the cylinders, and cables between the pistons and said intermediate means to move the pistons inwardly.

2. A salvage vessel comprising a main frame, cylinders carried by said main frame and having inner open ends arranged opposite and spaced from each other, means located between the cylinder ends to take up and let off cables, pistons movable in the said cylinders, cables between the pistons and the said intermediate means to move the pistons outwardly in the cylinders, and cables between the pistons and said intermediate means to move the pistons inwardly, in combination with means to supply the outer end portions of the cylinders with fluid under pressure; said means being valved whereby when necessary the said cylinder portions may be vented to the atmosphere.

3. A salvage vessel comprising a main frame, cylinders carried by said main frame and having inner open ends arranged opposite and spaced from each other, means located between the cylinder ends to take up and let off cables, pistons movable in the said cylinders, cables between the pistons and the said intermediate means to move the pistons outwardly in the cylinders, and cables between the pistons and said intermediate means to move the pistons inwardly, in combination with telescopic casings interposed between the pistons and the outer closed ends of the cylinders and housing the cables for moving the pistons outwardly.

4. A salvage vessel comprising a main frame, cylinders carried by said main frame and having inner open ends arranged opposite and spaced from each other, means located between the cylinder ends to take up and let off cables, pistons movable in the said cylinders, cables between the pistons and the said intermediate means to move the pistons outwardly in the cylinders, and cables between the pistons and said intermediate means to move the pistons inwardly, in combination with a propeller, a house carried by the main frame, means in the said house to actuate said intermediate means and to drive the propeller, and air compressing means also in the house.

In testimony whereof I affix my signature.

JOHN F. LUKOMSKE.